United States Patent
Yoshimi et al.

(10) Patent No.: US 12,389,122 B2
(45) Date of Patent: Aug. 12, 2025

(54) IMAGE CAPTURING APPARATUS, CONTROL METHOD THEREFOR, AND STORAGE MEDIUM STORING PROGRAM

(71) Applicant: CANON KABUSHIKI KAISHA, Tokyo (JP)

(72) Inventors: Takashi Yoshimi, Kanagawa (JP); Yuko Imai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/535,768

(22) Filed: Dec. 11, 2023

(65) Prior Publication Data
US 2024/0196097 A1      Jun. 13, 2024

(30) Foreign Application Priority Data
Dec. 13, 2022   (JP) .................................. 2022-198461

(51) Int. Cl.
*H04N 23/69*       (2023.01)
*H04N 23/698*      (2023.01)

(52) U.S. Cl.
CPC ................................ *H04N 23/698* (2023.01)

(58) Field of Classification Search
None
See application file for complete search history.

(56) References Cited

U.S. PATENT DOCUMENTS

2015/0312487 A1* 10/2015 Nomoto ............... H04N 23/631
                                                 348/239
2021/0132682 A1*  5/2021 Kim ........................ G06F 3/017

FOREIGN PATENT DOCUMENTS

JP    2020016767 A    1/2020
WO    2018/025825 A1  2/2018

* cited by examiner

*Primary Examiner* — Eileen M Adams
(74) *Attorney, Agent, or Firm* — Canon U.S.A., Inc. IP Division

(57) ABSTRACT

An image capturing apparatus detects a specific object from a first image generated based on an image formed on the image sensor via a first optical system, generates, upon detection of the specific object from the first image, a plurality of first images based on images formed on the image sensor via the plurality of optical systems, and stores the plurality of first images. The image capturing apparatus detects, after detection of the specific object from the first image, the specific object from a second image generated based on an image formed on the image sensor via the second optical system, and generates, upon detection of the specific object from the second image, a plurality of second images based on images formed on the image sensor via the plurality of optical systems, and store the plurality of second images.

17 Claims, 7 Drawing Sheets

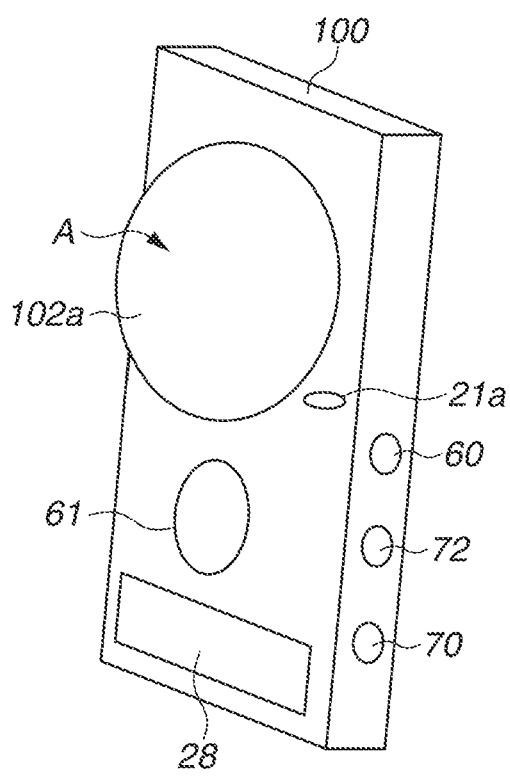
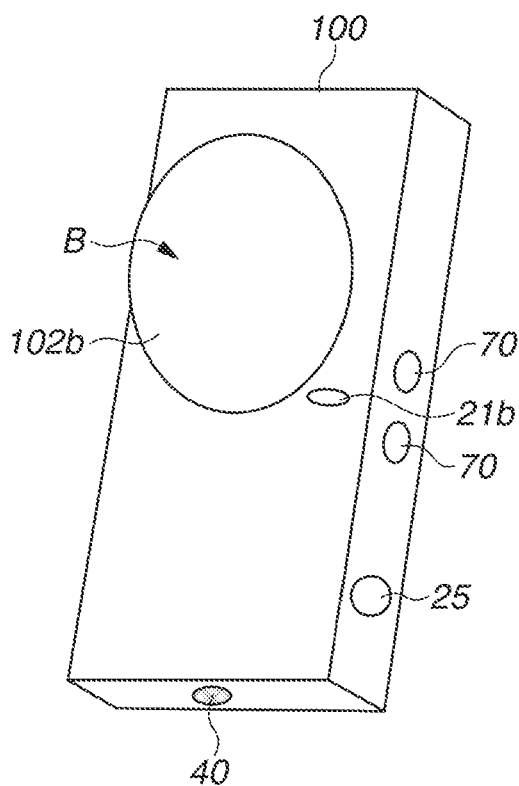

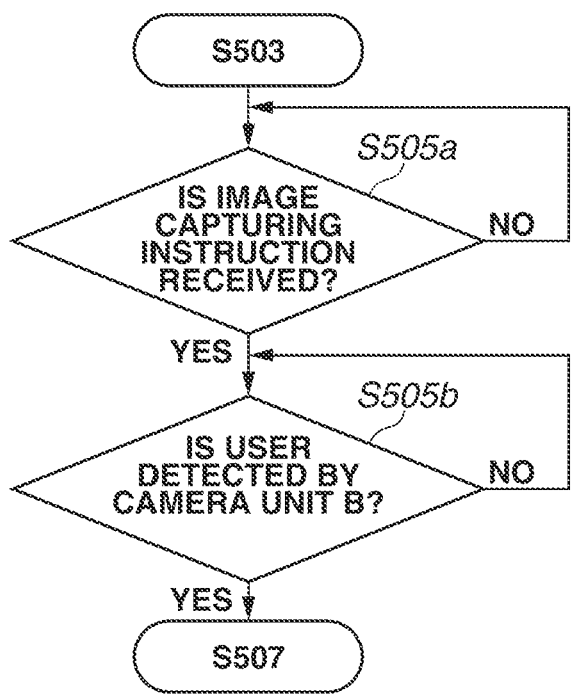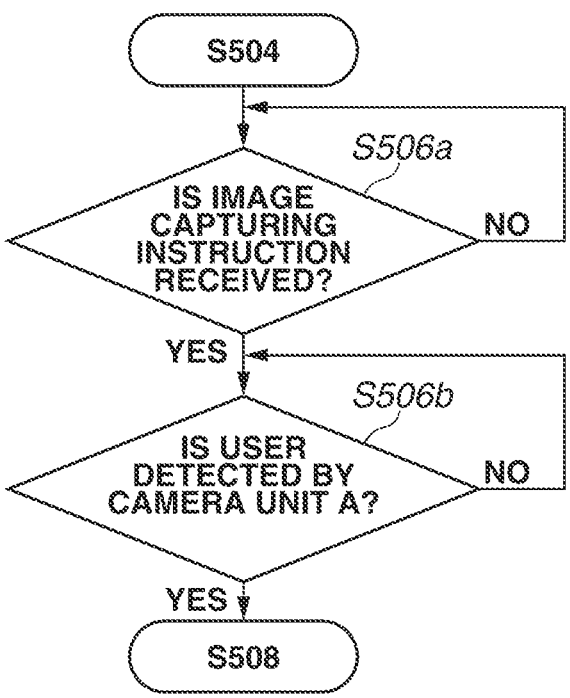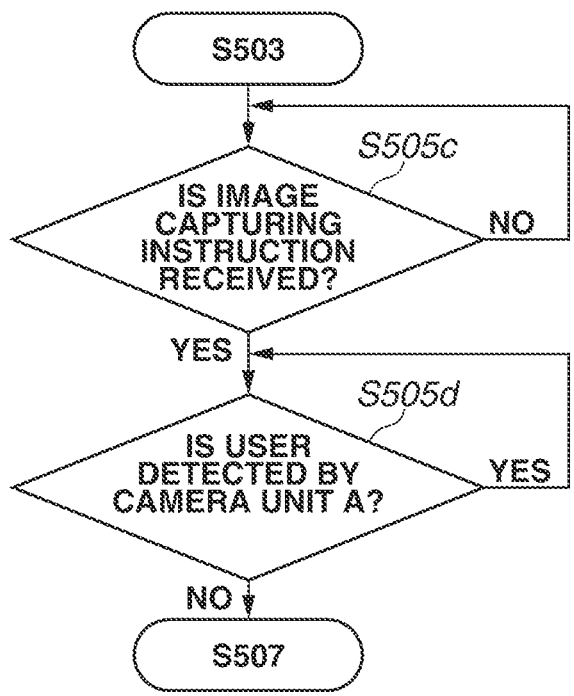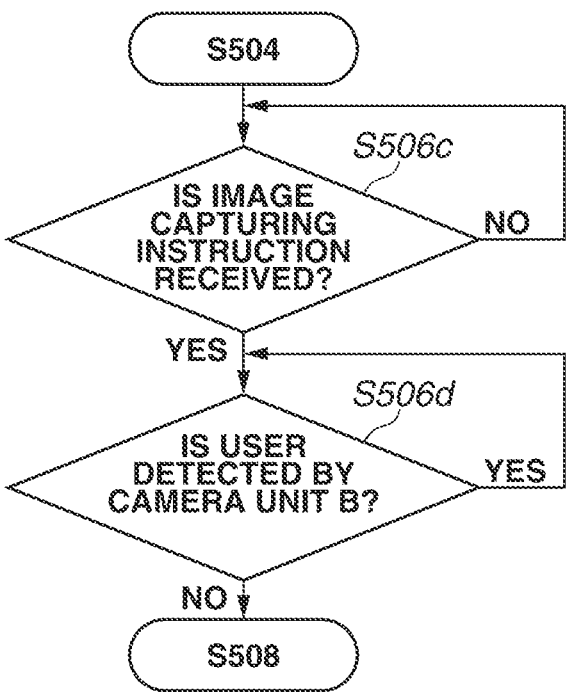

IMAGE CAPTURING APPARATUS, CONTROL METHOD THEREFOR, AND STORAGE MEDIUM STORING PROGRAM

BACKGROUND OF THE DISCLOSURE

Field of the Disclosure

The present disclosure relates to an image capturing apparatus suitably used for capturing a wide-range image, a control method for the image capturing apparatus, and a storage medium storing a program.

Description of the Related Art

Image capturing apparatuses (e.g., an omnidirectional camera) configured to capture an image over a wider range than a human viewing angle have become widespread in recent years. The image is called an omnidirectional image. Posting images captured by such image capturing apparatuses to an unspecified number of people through social networking services and the like on the Internet has become a widespread practice.

In the case of posting the images to an unspecified number of people, it is desirable to take measures for privacy protection to ensure that the images do not include information from which an individual can be identified. However, an image capturing apparatus configured to capture an omnidirectional image has almost no blind spot, so that a user ends up being included in the omnidirectional image. The issue occurs not only in an omnidirectional image, but also in a wide-range image.

A system in which images on both sides are captured by a twin-lens 360-degree camera with a time lag set using a timer, and these captured images are combined to form a 360-degree image is known. Thus, image capturing is performed twice with a time lag, and the user moves from a location in first image capturing to another location in second image capturing, which makes it possible to prevent the user from being captured in the 360-degree image. However, if the user has not moved sufficiently, or if the user has moved in an inappropriate direction, the 360-degree image in which the user is captured can be undesirably obtained.

Japanese Patent Application Laid-Open No. 2020-16767 discusses an image capturing apparatus that performs control to obtain a first image so that a specific object is included in another field range different from a first field range, and performs control to obtain a second image so that the specific object is not included in the other field range, and combines the first image with the second image.

International Publication No. 2018/025825 discusses an image capturing apparatus that captures a plurality of omnidirectional images including an object. The object moves during capturing of the plurality of images, which makes it possible to generate an image in which the object is removed in image combining processing.

However, the image capturing apparatuses of the related art described above are configured to perform image capturing a number of times and simply combine images obtained with a time lag. Accordingly, if the user has not moved sufficiently, or if the user has moved in an inappropriate direction, an omnidirectional image in which the user is captured can be undesirably obtained.

SUMMARY OF THE DISCLOSURE

The present disclosure has been made in view of the above-described circumstances and is directed to facilitating capturing a wide-range image in which a specific object, such as a user, is not captured.

According to an aspect of the present disclosure, an image capturing apparatus comprising an image sensor, a plurality of optical systems configured to form an image of an object on the image sensor, the plurality of optical systems including at least a first optical system and a second optical system, light from the object present in different ranges entering the first optical system and the second optical system, a processor and a memory storing a program which, when executed by the processor, causes the image capturing apparatus to detect a specific object from a first image generated based on an image formed on the image sensor via the first optical system, generate, upon detection of the specific object from the first image, a plurality of first images based on images formed on the image sensor via the plurality of optical systems, and store the plurality of first images, detect, after detection of the specific object from the first image, the specific object from a second image generated based on an image formed on the image sensor via the second optical system, and generate, upon detection of the specific object from the second image, a plurality of second images based on images formed on the image sensor via the plurality of optical systems, and store the plurality of second images.

Further features of the present disclosure will become apparent from the following description of exemplary embodiments with reference to the attached drawings.

BRIEF DESCRIPTION OF THE DRAWINGS

FIGS. 1A, 1B, and 1C each illustrate a digital camera according to a first exemplary embodiment.

FIGS. 6A, 6B, 6C, and 6D are flowcharts each illustrating details of image capturing operation trigger processing illustrated in FIG. 5.

DESCRIPTION OF THE EMBODIMENTS

Exemplary embodiments of the present disclosure will be described below with reference to the accompanying drawings.

Figure 1C:
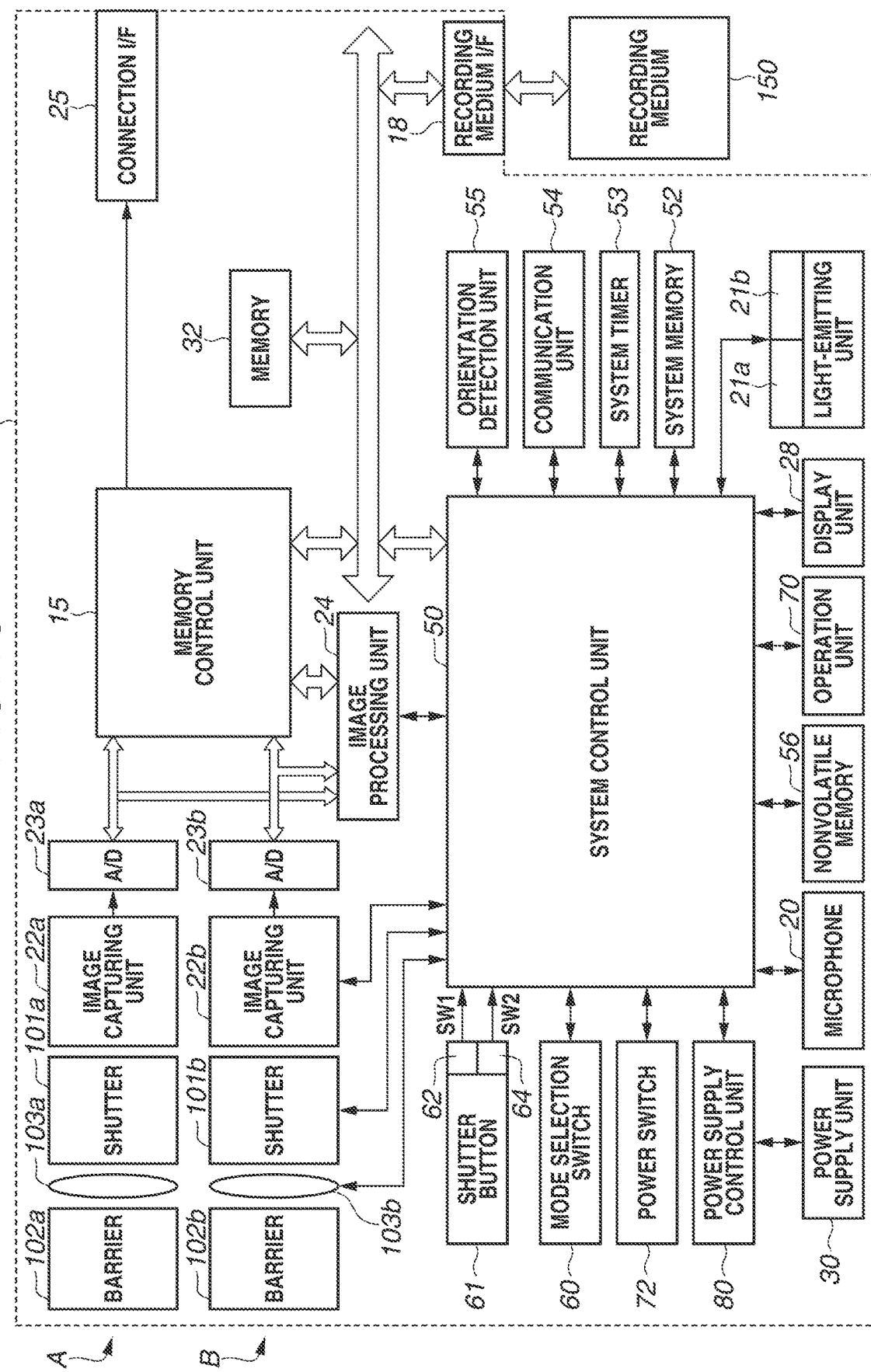

FIGS. 1A to 1C each illustrate a digital camera (hereinafter simply referred to as a camera) 100 as an image capturing apparatus according to a first exemplary embodiment. FIG. 1A is a front perspective view of the camera 100. FIG. 1B is a rear perspective view of the camera 100. The camera 100 is an omnidirectional camera that captures an omnidirectional image. Such a camera is also called a 360-degree camera, and an image captured by the camera is also referred to as a 360-degree image.

The camera 100 includes two camera units A and B having different image capturing ranges. The camera unit A is a wide-angle camera having an image capturing range at the front of the camera 100 and having a wide image capturing range of 180 degrees or more upward, downward, leftward, and rightward at the front of the camera 100. The camera unit B is a wide-angle camera having an image capturing range at the back of the camera 100 and having a wide image capturing range of 180 degrees or more upward, downward, leftward, and rightward at the back of the camera 100.

A front surface of the camera 100 is provided with a barrier 102a as a protective window that covers an image capturing system, including an imaging lens 103a (see FIG. 1C) of the camera unit A, to prevent contamination or damage of the image capturing system. The barrier 102a may be an outer surface of the imaging lens 103a. A display unit 28 displays various kinds of information. A shutter button 61 is an operation unit for issuing an image capturing instruction. A light-emitting unit 21a is a light-emitting member, such as a light-emitting diode (LED), and informs a user of various states of the camera 100 with a light-emitting pattern or a light-emitting color.

A back surface of the camera 100 is provided with a barrier 102b as a protective window that covers an image capturing system, including an imaging lens 103b (see FIG. 1C) of the camera unit B, to prevent contamination or damage of the image capturing system. The barrier 102b may be an outer surface of the imaging lens 103b. Similar to the light-emitting unit 21a, a light-emitting unit 21b is a light-emitting member, such as an LED, and informs the user of various states of the camera 100 with a light-emitting pattern or a light-emitting color.

A side surface of the camera 100 is provided with a mode selection switch 60 as an operation member for switching between various modes. An operation unit 70 is composed of operation members, such as various switches, buttons, dials, and touch sensors, to receive various operations from the user. A power switch 72 is a push button for switching between power-on and power-off. A connection interface (I/F) 25 is a connector to which a connection cable that connects the camera 100 and an external apparatus, such as a smartphone, a personal computer, or a television, is connected. A fixing portion 40 is, for example, a tripod screw hole. The fixing portion 40 is a portion that is to be fixed to a fixation device, such as a tripod.

FIG. 1C is a block diagram illustrating a configuration example of the camera 100.

The camera unit A includes the image capturing system including the imaging lens 103a, a shutter 101a, and an image capturing unit 22a. The imaging lens 103a is a wide-angle lens composed of a group of lenses including a zoom lens and a focus lens. Light from an object present in the image capturing range of the imaging lens 103a enters the imaging lens 103a and forms an image on the image capturing unit 22a. The shutter 101a has a diaphragm function that adjusts the amount of object light to be incident on the image capturing unit 22a. The image capturing unit 22a includes an image sensor, such as a charge-coupled device (CCD) sensor or a complementary metal-oxide semiconductor (CMOS) sensor, that converts an optical image into an electric signal. An analog-to-digital (A/D) converter 23a converts an analog signal output from the image capturing unit 22a into a digital signal.

The camera unit B includes the image capturing system including the imaging lens 103b, a shutter 101b, and an image capturing unit 22b. The imaging lens 103b is a wide-angle lens composed of a group of lenses including a zoom lens and a focus lens. Light from an object present in the image capturing range of the imaging lens 103b enters the imaging lens 103b and forms an image on the image capturing unit 22b. The shutter 101b has the diaphragm function that adjusts the amount of object light to be incident on the image capturing unit 22b. The image capturing unit 22b includes an image sensor, such as a CCD sensor or a CMOS sensor, that converts an optical image into an electric signal. An A/D converter 23b converts an analog signal output from the image capturing unit 22b into a digital signal.

The image capturing units 22a and 22b each capture, for example, a virtual reality (VR) image. The VR image is an image that can be displayed in VR. Examples of the VR image include an omnidirectional image captured by an omnidirectional camera, and a panoramic image having a video range (effective video range) wider than a display range of an image that can be displayed on the display unit 28 at once. The VR image includes not only a still image, but also a moving image and a live view image (an image obtained in substantially real time from the camera 100). The VR image has a video range (effective video range) covering a maximum of 360 degrees field of view in the up and down direction (vertical angle, zenith angle, elevation angle, depression angle, altitude angle) and in the left and right direction (horizontal angle, azimuth angle). The VR image needs not necessarily provide 360 degrees vertical coverage or 360 degrees horizontal coverage and also includes an image having a wider angle of view (field range) than that of an image that can be captured with a normal camera, or an image having a video range (effective video range) that is wider than the display range of an image that can be displayed on the display unit 28 at once. For example, an image captured with an omnidirectional camera configured to capture an image of an object in a field of view (angle of view) of 360 degrees in the left and right direction (horizontal angle, azimuth angle) and 210 degrees vertical angle from the zenith is a type of VR image. For example, another type of VR image is an image captured with a camera configured to capture an image of an object in a field of view (angle of view) of 180 degrees in the left and right direction (horizontal angle, azimuth angle) and 180 degrees vertical angle from the horizontal direction. In other words, an image having an image range covering a field of view of 160 degrees (±80 degrees) or more in both the up and down direction and the left and right direction and having a wider video range than a visible range of a human is a type of VR image. Displaying the VR image in VR (display mode: "VR view" display) while changing the orientation of a display apparatus in the left and right rotation direction enables the user to view an omnidirectional video image that is seamless in the left and right direction (horizontal rotation direction). In the up and down direction (vertical rotation direction), a seamless omnidirectional video image can be viewed in a range of ±105 degrees when viewed from the top (zenith). An area beyond 105 degrees from the top is a blank area where there is no video image. The VR image can also be referred to as an "image having a video range that forms at least a part of a virtual space (VR space)".

The VR display (VR view) is a display method (display mode) that displays a video image of a field range corresponding to the orientation of the display apparatus of the VR image, and the display range can be changed. In a case where the user wearing a head-mounted display (HMD) that is a display apparatus views the video image, the video image of the field range corresponding to the orientation of the face of the user is displayed. For example, a case is described where the video image being displayed at a certain point is a video image having a viewing angle (angle of view) of 0 degrees in the left and right direction (in a specific azimuth, e.g., north) and 90 degrees in the up and down direction (90 degrees from the zenith, i.e., horizontal direction), of the VR image. In this state, if the display apparatus is turned upside down (e.g., the orientation of a display surface is changed such that the display surface faces north instead of south), the display range is changed to display a video image having a viewing angle with the center at 180 degrees in the left and right direction (opposite azimuth, e.g., south) and 90 degrees in the up and down direction (horizontal direction). In the case where the user wearing an HMD is viewing a video image, if the user turns his or her face to the south from the north (that is, looks back), the video image displayed on the HMD is also changed from a video image of a northern area to a video image of a southern area. The VR display makes it possible to provide the user with such a feeling as if the user were in the VR image (in the VR space). A smartphone mounted on a VR goggle (head-mounted adapter) is a type of HMD. The VR image display method is not limited to the above-described method. The display range may be moved (scrolled) based not only on a change in the orientation, but also on a user operation on a touch panel, a directional button, or the like. Further, during the VR display (VR view mode), the display range may be changed based on a change in the display range due to a change in the orientation, on a touch movement operation on a touch panel, or on a drag operation on an operation member, such as a mouse.

An image processing unit 24 performs predetermined resizing processing, such as pixel interpolation or reduction, and color conversion processing on data supplied from the A/D converters 23a and 23b or data supplied from a memory control unit 15. The image processing unit 24 also performs predetermined arithmetic processing using captured image data. A system control unit 50 performs exposure control and ranging control based on an arithmetic processing result obtained by the image processing unit 24. Thus, through-the-lens (TTL) auto focus (AF) processing, automatic exposure (AE) processing, and flash preliminary emission (EF) processing are performed. In addition, the image processing unit 24 performs predetermined arithmetic processing using captured image data and performs TTL auto white balance (AWB) processing based on an obtained arithmetic processing result.

Further, the image processing unit 24 performs basic image processing on images (fish-eye images) obtained from the A/D converters 23a and 23b, and then combines the images (image connection processing) to thereby generate a single VR image. In the image connection processing for connecting images to be combined, the image processing unit 24 calculates the amount of displacement between a reference image and a comparison image for each area by pattern matching processing for each of the images to be combined, to thereby detect a connection position. In consideration of the detected connection position and characteristics of each optical system lens, the image processing unit 24 corrects a distortion of each of the images to be combined by geometric transformation and converts the images into an omnidirectional image format. By blending the images of the omnidirectional image format to be combined, the image processing unit 24 finally generates a single VR image (omnidirectional image). The generated omnidirectional image is, for example, an image generated using equidistant cylindrical projection. The position of each pixel in the omnidirectional image can be associated with coordinates on the surface of a sphere.

During VR display in live view or during playback, the image processing unit 24 performs image extraction processing for VR display of VR images, enlargement processing, distortion correction processing, or the like, and further performs rendering processing on a video random access memory (VRAM) of a memory 32.

Output data from the A/D converters 23a and 23b is written into the memory 32 via the image processing unit 24 and the memory control unit 15, or via the memory control unit 15. The memory 32 stores image data that is obtained by the image capturing units 22a and 22b and is converted into digital data by the A/D converters 23a and 23b and images to be output to an external display from the connection I/F 25. The memory 32 has a sufficient storage capacity to store a predetermined number of still images as well as a moving image and audio up to a predetermined amount of time. The memory 32 also functions as an image display memory (video memory). Data for image display stored in the memory 32 can be output to the external display from the connection I/F 25. The VR images that are captured by the image capturing units 22a and 22b, generated by the image processing unit 24, and accumulated in the memory 32 are sequentially transferred to and displayed on the external display. Thus, the external display functions as an electronic viewfinder and can provide a live view display (LV display). An image to be displayed in live view is hereinafter referred to as an LV image. The VR images accumulated in the memory 32 may be transferred to an external apparatus (e.g., smartphone) that is wirelessly connected via a communication unit 54 and displayed on the external apparatus to perform the LV display (remote LV display).

A nonvolatile memory 56 is a memory used as an electrically erasable and recordable recording medium. For example, an electrically erasable programmable read-only memory (EEPROM) can be used. The nonvolatile memory 56 stores constants, programs, and the like for the operation of the system control unit 50. The programs described herein refer to computer programs for executing various flowcharts to be described below in the present exemplary embodiment.

The system control unit 50 is a control unit including at least one processor or circuit and controls the camera 100 as a whole. The system control unit 50 executes the programs recorded on the nonvolatile memory 56, thereby implementing each processing according to the present exemplary embodiment described below. As a system memory 52, a RAM, for example, is used. Constants and variables for the operation of the system control unit 50, programs read from the nonvolatile memory 56, and the like are loaded into the system memory 52.

Further, the system control unit 50 controls the memory 32, the image processing unit 24, and the memory control unit 15, thereby performing display control processing.

A system timer 53 is a time measurement unit that measures time used in various kinds of control processing and time of a built-in clock.

The mode selection switch 60, the shutter button 61, and the operation unit 70 are operation members for inputting various operation instructions to the system control unit 50.

The mode selection switch 60 switches an operation mode of the system control unit 50 to any one of a still image recording mode, a moving image capturing mode, a playback mode, a communication connection mode, a user removal mode 1, a user removal mode 2, and the like. The still image recording mode includes an auto image capturing mode, an auto scene determination mode, a manual mode, an aperture priority mode (Av mode), a shutter speed priority mode (Tv mode), and a program AE mode. The still image recording mode also includes various scene modes in which image capturing settings are made for each image capturing scene, and a custom mode. The mode selection switch 60 enables the user to directly switch the operation mode to any one of these modes. Alternatively, after a screen is switched to an image capturing mode list screen once using the mode selection switch 60, any one of the modes displayed on the display unit 28 may be selected, and the mode is switched using another operation member. Similarly, the moving image capturing mode may include a plurality of modes.

A first shutter switch 62 is turned on halfway through an operation of the shutter button 61, i.e., in a half-pressed state thereof (image capturing preparation instruction), and a first shutter switch signal SW1 is generated. In response to the first shutter switch signal SW1, the system control unit 50 starts an image capturing preparation operation, such as AF processing, AE processing, AWB processing, or EF processing. A second shutter switch 64 is turned on when the operation of the shutter button 61 has completed, i.e., in a full-pressed state thereof (image capturing instruction), and a second shutter switch signal SW2 is generated. In response to the second shutter switch signal SW2, the system control unit 50 starts a series of image capturing processing operations from reading of signals from the image capturing units 22a and 22b to writing of image data to a recording medium 150. The shutter button 61 is not limited to a button that can be operated in two stages, i.e., full-pressing and half-pressing, but instead may be an operation member that can be pressed only into one stage.

In this case, the image capturing preparation operation and image capturing processing are continuously performed upon pressing of the shutter button 61 into one stage. The operation is identical to the operation in the case of full-pressing of the shutter button 61 that can be half-pressed and full-pressed (operation in a case where the shutter switch signals SW1 and SW2 are generated substantially simultaneously).

The operation members of the operation unit 70 act as various function buttons to which functions are allocated as appropriate for each scene, for example, by an operation of selecting from various function icons and options displayed on the display unit 28. Examples of the function buttons include an end button, a return button, an image feeding button, a jump button, a narrowing-down button, and an attribute change button. For example, when a menu button is pressed, a menu screen on which various settings can be made is displayed on the display unit 28. The user can intuitively make various settings by operating the operation unit 70 while looking at the menu screen displayed on the display unit 28.

A power supply control unit 80 includes a battery detection circuit, a direct current (DC)-DC converter, and a switch circuit for switching blocks to be energized, and detects whether a battery is attached, the type of battery, and a remaining battery level. The power supply control unit 80 controls the DC-DC converter based on the detection result and an instruction from the system control unit 50 and supplies necessary voltage to the units including the recording medium 150 for a necessary period of time. A power supply unit 30 may be a primary battery, such as an alkaline battery or a lithium (Li) battery, a secondary battery, such as a Nickel-Cadmium (NiCd) battery, a nickel metal hydride (NiMH) battery, or a lithium-ion battery, or an alternating current (AC) adapter.

A recording medium I/F 18 is an interface with the recording medium 150, such as a memory card or a hard disk. The recording medium 150 is a recording medium, such as a memory card, for recording captured images, and includes a semiconductor memory, an optical disk, a magnetic disk, or the like. The recording medium 150 may be a replaceable recording medium that is attachable to and detachable from the camera 100 or may be a recording medium built in the camera 100.

The communication unit 54 is connected wirelessly or with a cable to transmit and receive video signals, audio signals, and the like. The communication unit 54 can also be connected to a wireless local area network (LAN) and the Internet. The communication unit 54 can transmit images (including LV images) captured by the image capturing units 22a and 22b and images recorded on the recording medium 150, and can receive images and other various kinds of information from an external apparatus. Instead of being directly operated, the camera 100 can also be remotely operated using an external apparatus, such as a smartphone, that is wirelessly connected to the camera 100 via the communication unit 54 as a remote controller.

An orientation detection unit 55 detects the orientation of the camera 100 relative to the direction of gravitational force. On the basis of the orientation detected by the orientation detection unit 55, it is possible to determine whether images captured by the image capturing units 22a and 22b are images captured with the camera 100 held horizontally or images captured with the camera 100 held vertically. It is possible to determine an extent of tilting of the orientation in three axial directions of yaw, pitch, and roll when an image is captured. The system control unit 50 is configured to add orientation information corresponding to the orientation detected by the orientation detection unit 55 to an image file of each VR image captured by the image capturing units 22a and 22b and to rotate each image (adjust the orientation of each image to correct a tilt) and record the rotated image. As the orientation detection unit 55, a combination of one or more of an acceleration sensor, a gyroscope sensor, a geomagnetic sensor, a direction sensor, an altitude sensor, and the like can be used. A motion (pan, tilt, lift, stationary or not, etc.) of the camera 100 can also be detected using an acceleration sensor, a gyroscope sensor, or an azimuth sensor that is the orientation detection unit 55.

A microphone 20 collects sound in the surrounding of the camera 100, and the sound is recorded as audio of a moving image in VR images.

The connection I/F 25 is a connection plug to which a high-definition multimedia interface (HDMI®) cable, a universal serial bus (USB) cable, or the like is connected to connect the camera 100 to an external apparatus to transmit and receive video images.

Figure 2:
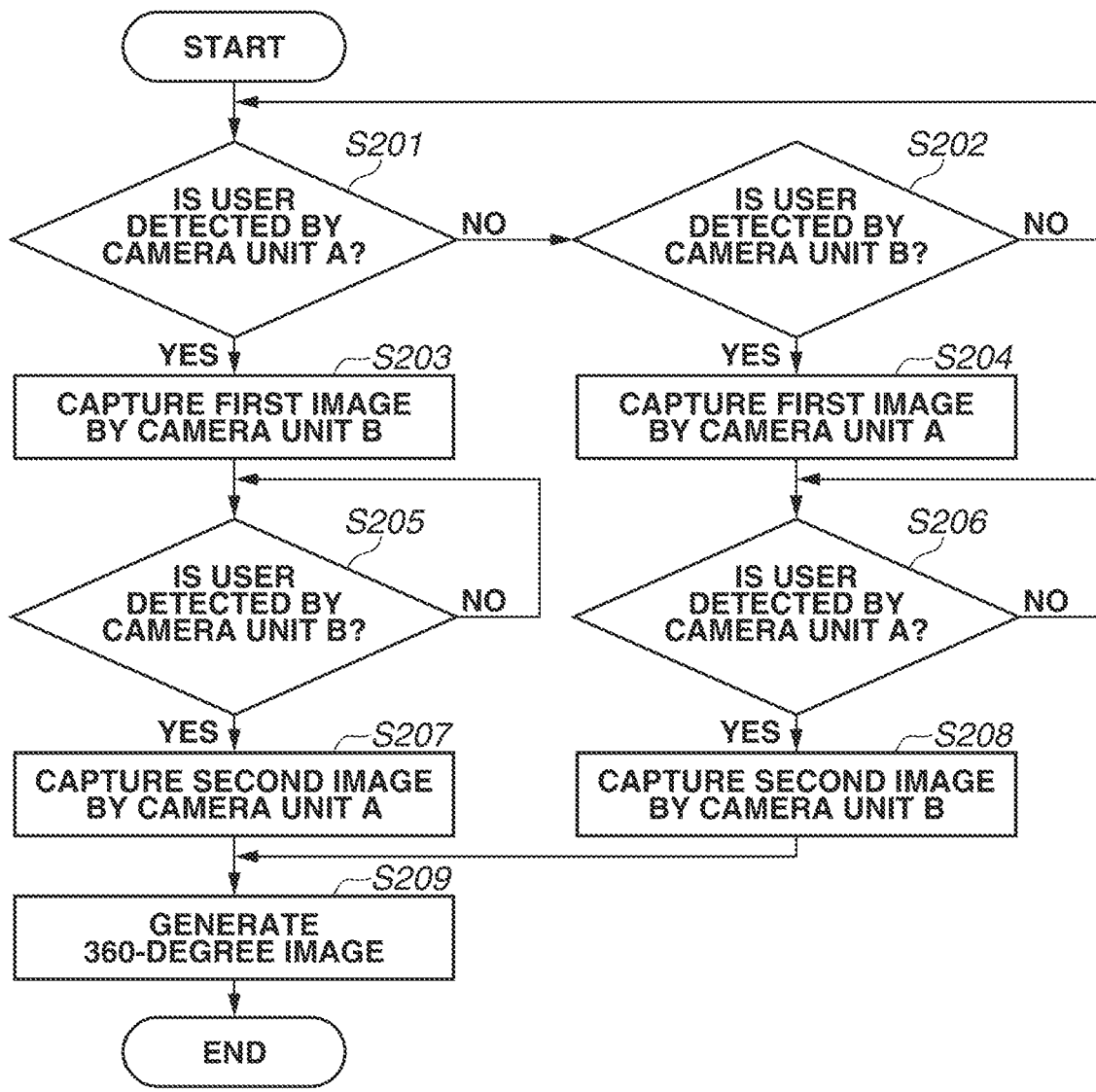
FIG. 2 is a flowchart illustrating image capturing processing of capturing an omnidirectional image executed by the digital camera according to the first exemplary embodiment.

Next, processing to be executed by the camera 100 according to the first exemplary embodiment will be described with reference to FIG. 2. FIG. 2 is a flowchart illustrating omnidirectional image capturing processing executed by the camera 100.

In the first exemplary embodiment, when a predetermined object is detected by one of the two camera units A and B, the other of the camera units A and B performs first image capturing. After the first image capturing, when the predetermined object is detected by the other of the camera units A and B, the one of the camera units A and B performs second image capturing. After that, an image obtained in the first image capturing is combined with an image obtained in the second image capturing.

The processing illustrated in the flowchart of FIG. 2 is implemented by the system control unit 50 loading a program recorded on the nonvolatile memory 56 into the system memory 52 and executing the program. When the camera 100 is powered on and a user removal mode is selected by operating the mode selection switch 60, the processing in the flowchart of FIG. 2 is started. The user removal mode is a mode in which image capturing is performed twice to capture an omnidirectional image including no person. If the user removal mode is selected, the system control unit 50 may display, on the display unit 28, information indicating start of image capturing to generate an omnidirectional image including no person or information indicating that the user needs to move to the opposite side after the first image capturing.

If the image capturing instruction is received (shutter button 61 is pressed, or the image capturing instruction is issued by a remote operation) and an image capturing operation is carried out, in step S201, the system control unit 50 determines whether the user, which corresponds to the predetermined object, is detected by the camera unit A. The system control unit 50 detects the user from an image captured by the camera unit A by, for example, face recognition or person recognition. If the user is detected by the camera unit A (YES in step S201), the processing proceeds to step S203. If the user is not detected by the camera unit A (NO in step S201), the processing proceeds to step S202.

In step S203, the system control unit 50 captures a first image (first image capturing) using the other camera unit B that is different from the camera unit A that has detected the user, and stores the captured image in the memory 32.

In step S205, the system control unit 50 waits until the user is detected by the camera unit B that has performed the first image capturing. If the user is detected by the camera unit B (YES in step S205), the processing proceeds to step S207.

A state where the user is detected by the camera unit B indicates that the user has moved and is now outside of an image capturing range of the camera unit A.

In step S207, the system control unit 50 captures a second image (second image capturing) using the camera unit A having the image capturing range in which the user is not present, and stores the captured image in the memory 32.

On the other hand, in step S202, the system control unit 50 determines whether the user is detected by the camera unit B. The system control unit 50 detects the user from an image captured by the camera unit B by, for example, face recognition or person recognition. If the user is detected by the camera unit B (YES in step S202), the processing proceeds to step S204. If the user is not detected by the camera unit B (NO in step S202), the processing returns to step S201.

Steps S204, S206, and S208 are similar to steps S203, S205, and S207, respectively, except that the camera unit A and the camera unit B are replaced with each other.

Specifically, in step S204, the system control unit 50 uses the other camera unit A, which is different from the camera unit B that has detected the user, to capture the first image (first image capturing), and stores the captured image in the memory 32.

In step S206, the system control unit 50 waits until the user is detected by the camera unit A that has performed the first image capturing. If the user is detected by the camera unit A (YES in step S206), the processing proceeds to step S208.

A state where the user is detected by the camera unit A indicates that the user has moved and is now outside of an image capturing range of the camera unit B.

In step S208, the system control unit 50 captures the second image (second image capturing) using the camera unit B having the image capturing range in which the user is not present, and stores the captured image in the memory 32.

In step S209, the system control unit 50 uses the image processing unit 24 to execute combining processing using the first image and the second image stored in the memory 32, thereby generating an omnidirectional image. The system control unit 50 stores the omnidirectional image in the recording medium 150, and then terminates the omnidirectional image capturing processing.

As described above, image capturing is performed by switching between the camera units A and B to be used depending on the result of user detection. Thus, the first image capturing and the second image capturing are performed on condition that the user is not captured in the images. This makes it possible to capture the wide-range images in which the user is not captured by a simple procedure.

If a time lag is set between the first image capturing and the second image capturing by a timer as in the related art, the user needs to move while checking the time. On the other hand, in the present exemplary embodiment, the first image capturing and the second image capturing are performed depending on the result of user detection, which eliminates the need for the user to check the time. In the case where a time lag is set between the first image capturing and the second image capturing by the timer, even if the user has smoothly moved after the first image capturing, the user needs to wait for a time set by the timer to elapse. On the other hand, in the present exemplary embodiment, the first image capturing and the second image capturing are performed depending on the result of user detection, which makes it possible to immediately perform the second image capturing if the user has smoothly moved after the first image capturing.

Consequently, an omnidirectional image in which the user is not captured can be more reliably obtained.

If the user is detected in steps S201, S202, S205, and S206, the light-emitting unit 21a or 21b in the camera unit that has detected the user may be turned on under the control of the system control unit 50. This configuration makes it possible to inform the user of which of the camera units A and B has detected the user.

When image capturing is performed in steps S203, S204, S207, and S208, the light-emitting unit 21a or 21b in the camera unit A or B that performs image capturing may be caused to blink, for example, under the control of the system control unit 50. This configuration makes it possible to inform the user of which one of the camera units A and B performs the image capturing. After the image capturing, the light-emitting units 21a and 21b are turned off. Turning-on and blinking patterns during detection of the user and during image capturing, respectively, may be reversed.

If the user is detected in steps S201, S202, S205, and S206, information indicating which one of the camera units A and B has detected the user may be displayed on the display unit 28 under the control of the system control unit 50 to thereby inform the user of the camera unit that has detected the user.

When the image capturing is performed in steps S203, S204, S207, and S208, information indicating which one of the camera units A and B performs the image capturing may be displayed on the display unit 28 under the control of the system control unit 50 to thereby inform the user of the camera unit that performs the image capturing. In this case, information about the detection of the user and information about the image capturing may be sequentially displayed or may be simultaneously displayed.

While, in the present exemplary embodiment, the combining processing in step S209 is executed by the camera 100, the present exemplary embodiment is not limited thereto. For example, the first image and the second image may be transferred to an external apparatus, and the combining processing in step S209 may be executed by the external apparatus.

In the flowchart of FIG. 2, the user is first detected by the camera unit A, and then is detected by the camera unit B. Alternatively, the user may be first detected by the camera unit B, and then may be detected by the camera unit A.

Next, a second exemplary embodiment will be described. A configuration of a camera according to the second exemplary embodiment is similar to the configuration of the camera 100 according to the first exemplary embodiment. Hereinafter, components in the second exemplary embodiment that are similar to the components in the first exemplary embodiment are denoted by the same reference numerals, and the descriptions thereof are omitted. Differences between the second exemplary embodiment and the first exemplary embodiment will be mainly described.

Figure 3:
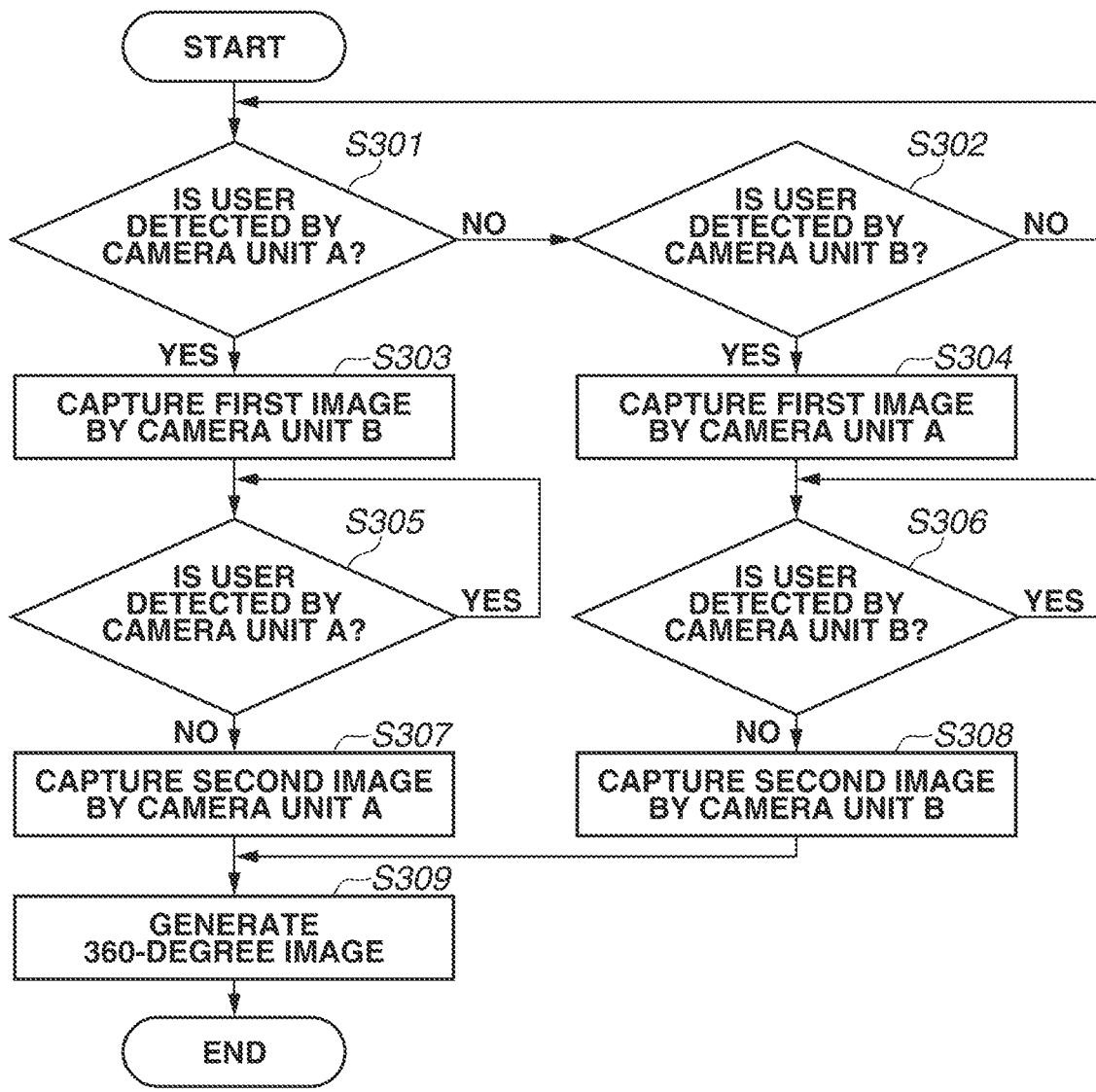
FIG. 3 is a flowchart illustrating image capturing processing of capturing an omnidirectional image executed by a digital camera according to a second exemplary embodiment.

Processing to be executed by a camera 100 according to the second exemplary embodiment will be described with reference to FIG. 3. FIG. 3 is a flowchart illustrating omnidirectional image capturing processing executed by the camera 100.

In the second exemplary embodiment, when a predetermined object is detected by one of the two camera units A and B, the other of the camera units A and B performs first image capturing. After the first image capturing, when the predetermined object is no longer detected by the one of the camera units A and B, the one of the camera units A and B performs second image capturing. After that, an image obtained in the first image capturing is combined with an image obtained in the second image capturing.

The processing illustrated in the flowchart of FIG. 3 is implemented by the system control unit 50 loading a program recorded on the nonvolatile memory 56 into the system memory 52 and executing the program. When the camera 100 is powered on and a user removal mode is selected by operating the mode selection switch 60, the processing in the flowchart of FIG. 3 is started.

The processes of steps S301 to S304 and S309 are respectively similar to the processes of steps S201 to S204 and S209 in the first exemplary embodiment, and thus the descriptions thereof are omitted.

In step S305, the system control unit 50 waits until the user is no longer detected by the camera unit A that has detected the user once. If the user is no longer detected by the camera unit A (NO in step S305), the processing proceeds to step S307. A state where the user is no longer detected by the camera unit A indicates that the user has moved and is now outside of the image capturing range of the camera unit A.

In step S307, the system control unit 50 captures a second image (second image capturing) using the camera unit A having the image capturing range in which the user is not present, and stores the captured image in the memory 32.

On the other hand, in step S306, the system control unit 50 waits until the user is no longer detected by the camera unit B that has detected the user once. If the user is no longer detected by the camera unit B (NO in step S306), the processing proceeds to step S308. A state where the user is no longer detected by the camera unit B indicates that the user has moved and is now outside of the image capturing range of the camera unit B.

In step S308, the system control unit 50 captures the second image (second image capturing) using the camera unit B having the image capturing range in which the user is not present, and stores the captured image in the memory 32.

As described above, as in the first exemplary embodiment, an omnidirectional image in which the user is not captured can be more reliably obtained.

Further, for example, the user may be able to select a desired mode between the user removal mode described in the first exemplary embodiment, which is referred to as "user removal mode 1", and the user removal mode described in the second exemplary embodiment, which is referred to as "user removal mode 2".

Next, a third exemplary embodiment will be described. A configuration of a camera according to the third exemplary embodiment is similar to the configuration of the camera 100 according to the first exemplary embodiment. Hereinafter, components in the third exemplary embodiment that are similar to the components in the first exemplary embodiment are denoted by the same reference numerals, and the descriptions thereof are omitted. Differences between the third exemplary embodiment and the first exemplary embodiment will be mainly described.

Figure 4:
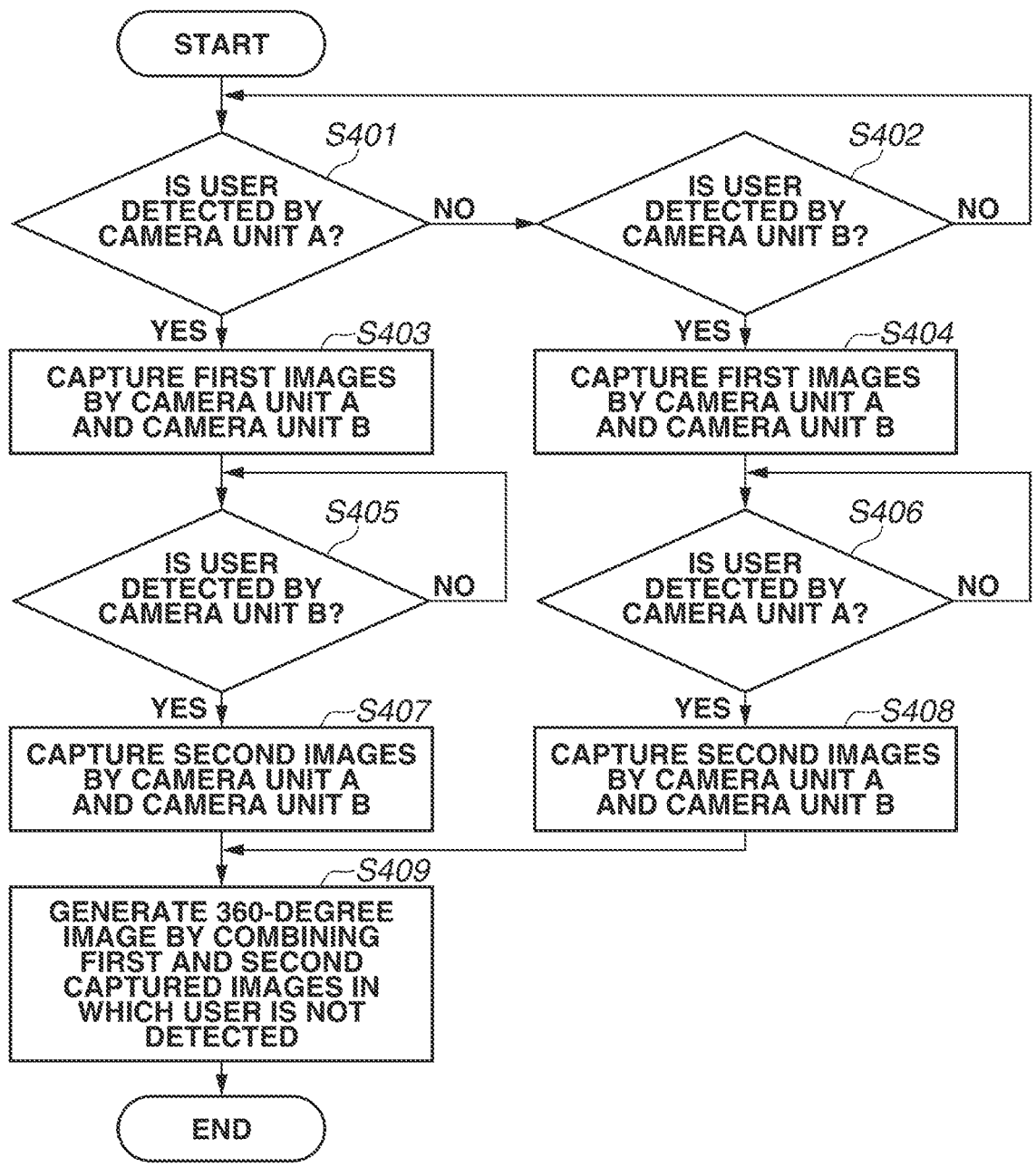
FIG. 4 is a flowchart illustrating image capturing processing of capturing an omnidirectional image executed by a digital camera according to a third exemplary embodiment.

Processing to be executed by a camera 100 according to the third exemplary embodiment will be described with reference to FIG. 4. FIG. 4 is a flowchart illustrating omnidirectional image capturing processing executed by the camera 100.

In the third exemplary embodiment, when a predetermined object is detected by one of the two camera units A and B, first image capturing is performed by both of the camera units A and B. After the first image capturing, when the predetermined object is detected by the other of the camera units A and B, second image capturing is performed by both of the camera units A and B. After that, an image in which the predetermined object is not detected among images obtained in the first image capturing is combined with an image in which the predetermined object is not detected among images obtained in the second image capturing.

The processing illustrated in the flowchart of FIG. 4 is implemented by the system control unit 50 loading a program recorded on the nonvolatile memory 56 into the system memory 52 and executing the program. When the camera 100 is powered on and a user removal mode is selected by operating the mode selection switch 60, the processing in the flowchart of FIG. 4 is started.

The processes of steps S401, S402, S405, and S406 are respectively similar to the processes of steps S201, S202, S205, and S206 in the first exemplary embodiment, and thus the descriptions thereof are omitted.

In steps S403 and S404, the system control unit 50 captures first images (first image capturing) using the camera unit A and the camera unit B, and stores the captured images in the memory 32. Specifically, the image captured by the camera unit A and the image captured by the camera unit B are stored as the first images.

In steps S407 and S408, the system control unit 50 captures second images (second image capturing) using the camera unit A and the camera unit B, and stores the captured images in the memory 32. Specifically, the image captured by the camera unit A and the image captured by the camera unit B are stored as the second images.

In step S409, the system control unit 50 uses the image processing unit 24 to execute combining processing using an image in which the user is not detected of the first images stored in the memory 32 and an image in which the user is not detected of the second images stored in the memory 32, thereby generating an omnidirectional image. The system control unit 50 stores the omnidirectional image in the recording medium 150, and then terminates the omnidirectional image capturing processing. The images in which the user is not detected are selected in step S409. Alternatively, for example, the images in which the user is not detected may be selected in steps S403, S404, S407, and S408.

In step S409, the system control unit 50 may perform recording control processing to store the captured images in the recording medium 150 by adding information based on which the image in which the user is not detected of the first images stored in the memory 32 and the image in which the user is not detected of the second images stored in the memory 32 are identifiable, instead of executing the combining processing using the image processing unit 24. Then, an external apparatus may read the information from the recording medium 150, and the combining processing may be executed using the image in which the user is not detected of the first images and the image in which the user is not detected of the second images.

As described above, as in the first exemplary embodiment, an omnidirectional image in which the user is not captured can be more reliably obtained.

While, in the present exemplary embodiment, an example based on "user removal mode 1" described in the first exemplary embodiment is described, the present exemplary embodiment is not limited thereto. Alternatively, the first image capturing and the second image capturing may be performed using the camera unit A and the camera unit B based on "user removal mode 2" described in the second exemplary embodiment.

Further, for example, the user may be able to select a desired mode among the user removal mode described in the first exemplary embodiment, which is referred to as "user removal mode 1", the user removal mode described in the second exemplary embodiment, which is referred to as "user removal mode 2", and the user removal mode described in the third exemplary embodiment, which is referred to as "user removal mode 3".

Next, a fourth exemplary embodiment will be described. A configuration of a camera according to the fourth exemplary embodiment is similar to the configuration of the camera 100 according to the first exemplary embodiment. Hereinafter, components in the fourth exemplary embodiment that are similar to the components in the first exemplary embodiment are denoted by the same reference numerals, and the descriptions thereof are omitted. Differences between the fourth exemplary embodiment and the first exemplary embodiment will be mainly described.

Figure 5:
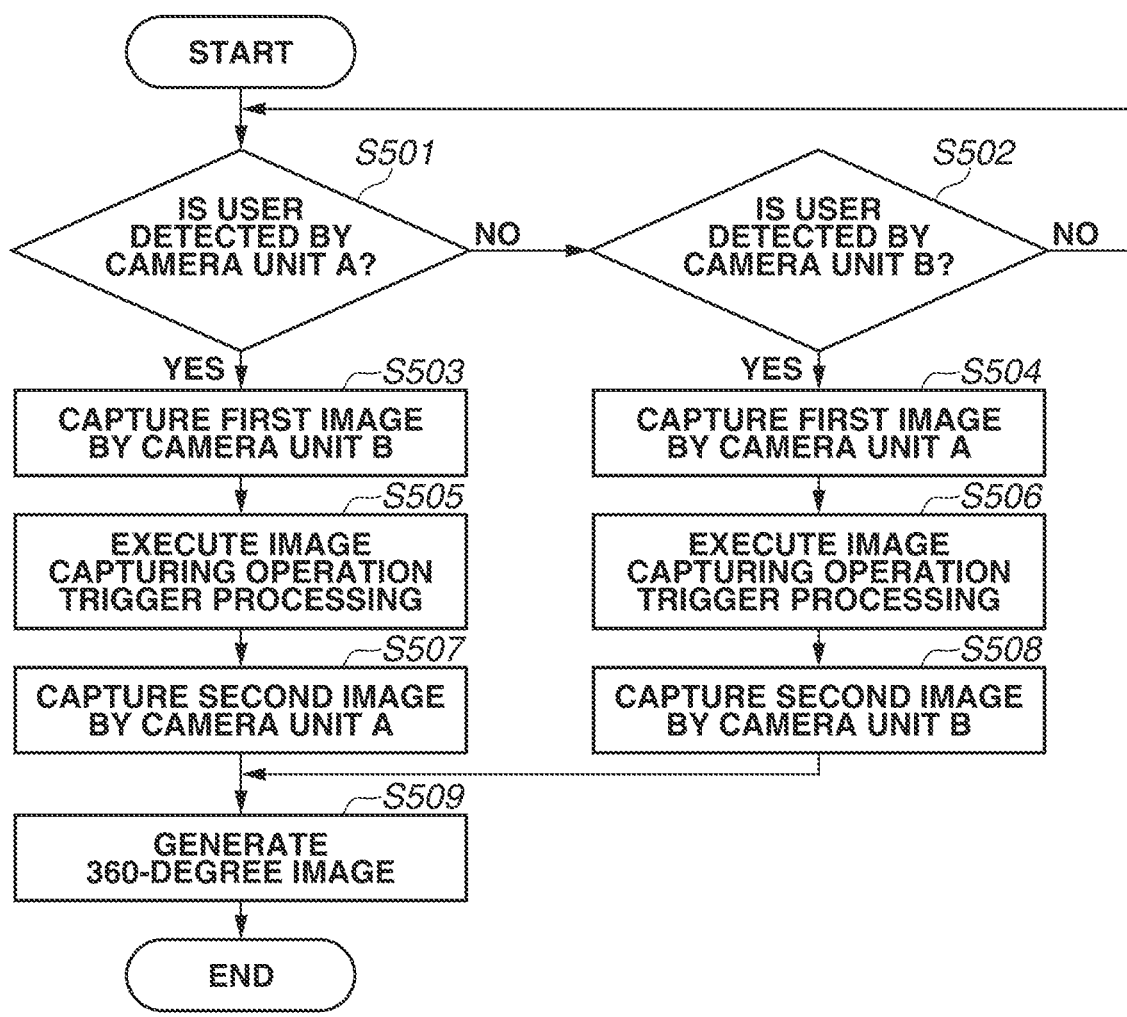
FIG. 5 is a flowchart illustrating image capturing processing of capturing an omnidirectional image executed by a digital camera according to a fourth exemplary embodiment.

Processing to be executed by a camera 100 according to the fourth exemplary embodiment will be described with reference to FIGS. 5 and 6A to 6D. FIG. 5 is a flowchart illustrating omnidirectional image capturing processing executed by the camera 100. FIGS. 6A to 6D are flowcharts each illustrating details of image capturing operation trigger processing illustrated in FIG. 5.

The fourth exemplary embodiment describes an example where second image capturing is performed on the condition that an image capturing instruction is received after first image capturing is performed.

The processing illustrated in the flowchart of FIG. 5 is implemented by the system control unit 50 loading a program recorded on the nonvolatile memory 56 into the system memory 52 and executing the program. When the camera 100 is powered on and a user removal mode is selected by operating the mode selection switch 60, the processing in the flowchart of FIG. 5 is started. In the present exemplary embodiment, the user can select either "user removal mode 1" or "user removal mode 2".

The processes of steps S501 to S504 and S507 to S509 are respectively similar to the processes of steps S201 to step S204 and S207 to S209 in the first exemplary embodiment, and thus the descriptions thereof are omitted.

In step S505, the system control unit 50 executes image capturing operation trigger processing.

If "user removal mode 1" is selected, as illustrated in FIG. 6A, in step S505a, the system control unit 50 waits until the image capturing instruction is received. If the image capturing instruction is received (YES in step S505a), the processing proceeds to step S505b. In step S505b, the system control unit 50 waits until the user is detected by the camera unit B that has performed the first image capturing. If the user is detected by the camera unit B (YES in step S505b), the processing proceeds to step S507.

If "user removal mode 2" is selected, as illustrated in FIG. 6C, in step S505c, the system control unit 50 waits until the image capturing instruction is received. If the image capturing instruction is received (YES in step S505c), the processing proceeds to step S505d. In step S505d, the system control unit 50 waits until the user is no longer detected by the camera unit A that has detected the user once. If the user is no longer detected by the camera unit A (NO in step S505d), the processing proceeds to step S507.

On the other hand, in step S506, the system control unit 50 executes the image capturing operation trigger processing.

If "user removal mode 1" is selected, as illustrated in FIG. 6B, in step S506a, the system control unit 50 waits until the image capturing instruction is received. If the image capturing instruction is received (YES in step S506a), the processing proceeds to step S506b. In step S506b, the system control unit 50 waits until the user is detected by the camera unit A that has performed the first image capturing. If the user is detected by the camera unit A (YES in step S506b), the processing proceeds to step S508.

If "user removal mode 2" is selected, as illustrated in FIG. 6D, in step S506c, the system control unit 50 waits until the image capturing instruction is received. If the image capturing instruction is received (YES in step S506c), the processing proceeds to step S506d. In step S506d, the system control unit 50 waits until the user is no longer detected by the camera unit B that has detected the user once. If the user is no longer detected by the camera unit B (NO in step S506d), the processing proceeds to step S508.

As described above, as in the first exemplary embodiment, an omnidirectional image in which the user is not captured can be more reliably obtained.

While, in the present exemplary embodiment, an example where an omnidirectional image is captured is described, the present exemplary embodiment is not limited thereto. The present disclosure can be applied to capturing of a wide-range image.

Various kinds of control processing described as being executed by the system control unit 50 in the above-described exemplary embodiments may be executed by one piece of hardware or by a plurality of pieces of hardware (e.g., a plurality of processors or circuits) sharing the processing to control the entire apparatus.

While, in the above-described exemplary embodiments, the digital camera 100 is described as the image capturing apparatus to which the present disclosure is applied, the image capturing apparatus is not limited thereto. The present disclosure can also be applied to any electronic apparatus, such as a smartphone, as long as the electronic apparatus functions as an image capturing apparatus including two camera units having different image capturing ranges.

The above-described exemplary embodiments illustrate an example in which the camera 100 functions as a control apparatus for the image capturing apparatus to which the present disclosure is applied. Alternatively, for example, the control apparatus for the image capturing apparatus to which the present disclosure is applied may be configured as an apparatus different from the image capturing apparatus, such as the camera 100.

The exemplary embodiments of the present disclosure have been described above. The above-described exemplary embodiments, however, are merely specific examples for carrying out the present disclosure, and the technical scope of the present disclosure should not be interpreted in a limited way. In other words, the present disclosure can be carried out in various forms without departing from the technical idea or the main features thereof.

According to the exemplary embodiments of the present disclosure, a wide-range image in which a predetermined object, such as a user, is not captured can be more reliably obtained.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-198461, filed Dec. 13, 2022, which is hereby incorporated by reference herein in its entirety.

What is claimed is:

1. An image capturing apparatus comprising:
an image sensor;
a plurality of optical systems configured to form an image of an object on the image sensor, the plurality of optical systems including at least a first optical system and a second optical system, light reflected from the object present in different spatial ranges entering the first optical system and the second optical system;
a processor; and
a memory storing a program which, when executed by the processor, causes the image capturing apparatus to:
detect a specific object from a first image generated based on an image formed on the image sensor via the first optical system;
generate, upon detection of the specific object from the first image, a plurality of first images based on images formed on the image sensor via the first optical system and the second optical system, and store the plurality of first images;
detect, after detection of the specific object from the first image, the specific object from a second image generated based on an image formed on the image sensor via the second optical system;
generate, upon detection of the specific object from the second image, a plurality of second images based on images formed on the image sensor via the plurality of optical systems, and store the plurality of second images; and
combine an image of the plurality of first images in which the specific object is not detected with an image in the plurality of second images in which the specific object is not detected,
wherein the image of the plurality of first images in which the specific object is not detected is an image other than the image generated based on the image formed on the image sensor via the first optical system, and the image of the plurality of second images in which the specific object is not detected is an image other than the image generated based on the image formed on the image sensor via the second optical system.

2. The image capturing apparatus according to claim 1, wherein the image of the plurality of first images in which the specific object is not detected is an image generated based on the image formed on the image sensor via the second optical system, and the image of the plurality of second images in which the specific object is not detected is an image generated based on the image formed on the image sensor via the first optical system.

3. The image capturing apparatus according to claim 1, wherein the program when executed by the processor causes the image capturing apparatus to perform control to store the plurality of first images and the plurality of second images in a recording medium after adding information indicating the specific object has not been detected based on which the image of the plurality of second images in which the specific object is not detected and the image of the plurality of first images in which the specific object is not detected are identified.

4. The image capturing apparatus according to claim 1,
wherein the program when executed by the processor causes the image capturing apparatus to select any one of a plurality of operation modes according to a user operation, and
wherein, in a case where a predetermined operation mode is selected, the plurality of first images and the plurality of second images are generated and stored.

5. The image capturing apparatus according to claim 1,
wherein the program when executed by the processor causes the image capturing apparatus to receive an image capturing instruction according to a user operation, and
wherein, upon reception of the image capturing instruction, processing for detecting the specific object from the first image is executed.

6. An image capturing apparatus comprising:
an image sensor;
a plurality of optical systems configured to form an image of an object on the image sensor, the plurality of optical systems including at least a first optical system and a second optical system, light reflected from the object present in different spatial ranges entering the first optical system and the second optical system;
a processor; and
a memory storing a program which, when executed by the processor, causes the image capturing apparatus to:
detect a specific object from a first image generated based on an image formed on the image sensor via the first optical system;
generate, upon detection of the specific object from the second image, a plurality of second images based on an image formed on the image sensor via the first optical system and the second optical system, and store the plurality of second images; and
issue a notification as to whether the specific object that is detected from the first image or the second image is identifiable.

7. The image capturing apparatus according to claim 6, wherein the program when executed by the processor causes the image capturing apparatus to issue the notification using a notification unit of an optical system corresponding to one of the first image and the second image from which the specific object is detected.

8. The image capturing apparatus according to claim 6, wherein the program when executed by the processor causes the image capturing apparatus to combine an image of the plurality of first images in which the specific object is not detected with an image of the plurality of second images in which the specific object is not detected.

9. The image capturing apparatus according to claim 8, wherein the image of the plurality of first images in which the specific object is not detected is an image other than the image generated based on the image formed on the image sensor via the first optical system, and the image of the plurality of second images in which the specific object is not detected is an image other than the image generated based on the image formed on the image sensor via the second optical system.

10. The image capturing apparatus according to claim 6, wherein the image of the plurality of first images in which the specific object is not detected is an image generated based on the image formed on the image sensor via the second optical system, and the image of the plurality of second images in which the specific object is not detected is an image generated based on the image formed on the image sensor via the first optical system.

11. The image capturing apparatus according to claim 6, wherein the program when executed by the processor causes the image capturing apparatus to perform control to store the plurality of first images and the plurality of second images in a recording medium after adding information based on which the image of the plurality of second images in which the specific object is not detected and the image of the plurality of first images in which the specific object is not detected are identified.

12. The image capturing apparatus according to claim 6,
wherein the program when executed by the processor causes the image capturing apparatus to select any one of a plurality of operation modes according to a user operation, and
wherein, in a case where a predetermined operation mode is selected, the plurality of first images and the plurality of second images are generated and stored.

13. The image capturing apparatus according to claim 6,
wherein the program when executed by the processor causes the image capturing apparatus to receive an image capturing instruction according to a user operation, and
wherein, upon reception of the image capturing instruction, processing for detecting the specific object from the first image is executed.

14. A control method for an image capturing apparatus including an image sensor and a plurality of optical systems configured to form an image of an object on the image sensor, the plurality of optical systems including at least a first optical system and a second optical system, light reflected from the object present in different spatial ranges entering the first optical system and the second optical system, the control method comprising:
detecting a specific object from a first image generated based on an image formed on the image sensor via the first optical system;
generating, upon detection of the specific object from the first image, a plurality of first images based on images formed on the image sensor via the first optical system and the second optical system, and storing the plurality of first images;
detecting, after detection of the specific object from the first image, the specific object from a second image generated based on an image formed on the image sensor via the second optical system;
generating, upon detection of the specific object from the second image, a plurality of second images based on images formed on the image sensor via the plurality of optical systems, and storing the plurality of second images; and
combining an image of the plurality of first images in which the specific object is not detected with an image of the plurality of second images in which the specific object is not detected,
wherein the image of the plurality of first images in which the specific object is not detected is an image other than the image generated based on the image formed on the image sensor via the first optical system, and the image of the plurality of second images in which the specific object is not detected is an image other than the image generated based on the image formed on the image sensor via the second optical system.

15. A non-transitory computer-readable storage medium storing a program for causing a computer to execute a control method for an image capturing apparatus including an image sensor and a plurality of optical systems configured to form an image of an object on the image sensor, the plurality of optical systems including at least a first optical system and a second optical system, light reflected from the object present in different spatial ranges entering the first optical system and the second optical system, the control method comprising:

detecting a specific object from a first image generated based on an image formed on the image sensor via the first optical system;

generating, upon detection of the specific object from the first image, a plurality of first images based on images formed on the image sensor via the first optical system and the second optical system, and storing the plurality of first images;

detecting, after detection of the specific object from the first image, the specific object from a second image generated based on an image formed on the image sensor via the second optical system;

generating, upon detection of the specific object from the second image, a plurality of second images based on images formed on the image sensor via the plurality of optical systems, and storing the plurality of second images; and combining an image of the plurality of first images in which the specific object is not detected with an image of the plurality of second images in which the specific object is not detected, wherein the image of the plurality of first images in which the specific object is not detected is an image other than the image generated based on the image formed on the image sensor via the first optical system, and the image of the plurality of second images in which the specific object is not detected is an image other than the image generated based on the image formed on the image sensor via the second optical system.

16. A control method for an image capturing apparatus including an image sensor and a plurality of optical systems configured to form an image of an object on the image sensor, the plurality of optical systems including at least a first optical system and a second optical system, light reflected from the object present in different spatial ranges entering the first optical system and the second optical system, the control method comprising:

detecting a specific object from a first image generated based on an image formed on the image sensor via the first optical system;

generating, upon detection of the specific object from the first image, a plurality of first images based on images formed on the image sensor via the first optical system and the second optical system, and storing the plurality of first images;

detecting, after detection of the specific object from the first image, the specific object from a second image generated based on an image formed on the image sensor via the second optical system;

generating, upon detection of the specific object from the second image, a plurality of second images based on images formed on the image sensor via the plurality of optical systems, and storing the plurality of second images; and issuing a notification as to whether the specific object that is detected from the first image or the second image is identifiable.

17. A non-transitory computer-readable storage medium storing a program for causing a computer to execute a control method for an image capturing apparatus including an image sensor and a plurality of optical systems configured to form an image of an object on the image sensor, the plurality of optical systems including at least a first optical system and a second optical system, light reflected from the object present in different spatial ranges entering the first optical system and the second optical system, the control method comprising:

detecting a specific object from a first image generated based on an image formed on the image sensor via the first optical system;

generating, upon detection of the specific object from the first image, a plurality of first images based on images formed on the image sensor via the first optical system and the second optical system, and storing the plurality of first images;

detecting, after detection of the specific object from the first image, the specific object from a second image generated based on an image formed on the image sensor via the second optical system;

generating, upon detection of the specific object from the second image, a plurality of second images based on images formed on the image sensor via the plurality of optical systems, and storing the plurality of second images; and issuing a notification as to whether the specific object that is detected from the first image or the second image is identifiable.

* * * * *